United States Patent
Lu et al.

(10) Patent No.: US 12,206,322 B2
(45) Date of Patent: Jan. 21, 2025

(54) CONTROL METHOD AND POWER CONTROLLER FOR POWER FACTOR CORRECTION

(71) Applicant: Leadtrend Technology Corporation, Zhubei (TW)

(72) Inventors: Hsin Hung Lu, Zhubei (TW); Ruei Jhih Jheng, Zhubei (TW); Wei Cheng Su, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 315 days.

(21) Appl. No.: 17/938,067

(22) Filed: Oct. 5, 2022

(65) Prior Publication Data
US 2023/0179089 A1    Jun. 8, 2023

Related U.S. Application Data

(60) Provisional application No. 63/286,527, filed on Dec. 6, 2021.

(51) Int. Cl.
*H02M 3/158*    (2006.01)
*H02M 1/00*    (2006.01)
*H02M 1/42*    (2007.01)

(52) U.S. Cl.
CPC ....... *H02M 1/4225* (2013.01); *H02M 1/0006* (2021.05); *H02M 3/158* (2013.01)

(58) Field of Classification Search
CPC ... H02M 1/4225; H02M 1/0006; H02M 3/158
See application file for complete search history.

(56) References Cited

U.S. PATENT DOCUMENTS

| | | | |
|---|---|---|---|
| 10,298,116 B2 | 5/2019 | Gritti et al. | |
| 10,666,153 B2* | 5/2020 | Chen | H02M 3/33507 |
| 2012/0224397 A1* | 9/2012 | Yeh | H02M 3/33507 |
| | | | 363/21.12 |
| 2014/0043866 A1* | 2/2014 | Zhao | H02M 3/33507 |
| | | | 363/21.12 |
| 2016/0248323 A1 | 8/2016 | Gritti et al. | |
| 2021/0367507 A1* | 11/2021 | Deng | H02M 1/4225 |
| 2023/0170781 A1* | 6/2023 | Chou | H02M 3/33571 |
| | | | 323/282 |
| 2023/0344356 A1* | 10/2023 | Lu | H02M 1/0064 |
| 2024/0072672 A1* | 2/2024 | Chen | H02M 3/1586 |

\* cited by examiner

*Primary Examiner* — Adolf D Berhane
(74) *Attorney, Agent, or Firm* — McClure, Qualey & Rodack, LLP

(57) ABSTRACT

A PFC power converter includes a power switch and an inductive device. A compensation signal is provided in response to an output voltage of the PFC power converter. An adapted compensation signal is provided in response to an ON time of the power switch and the compensation signal, to make the adapted compensation signal, the ON time, and the adapted compensation signal fit a predetermined correlation. The ON time of the power switch is determined in response to the adapted compensation signal. The PFC power converter is capable of achieving high PF when operating in discontinuous conduction mode.

12 Claims, 3 Drawing Sheets

CONTROL METHOD AND POWER CONTROLLER FOR POWER FACTOR CORRECTION

CROSS-REFERENCE TO RELATED APPLICATION

This application claims priority to and the benefit of U.S. provisional Application No. 63/286,527 filed on Dec. 6, 2021, which is incorporated by reference in its entirety.

BACKGROUND

The present disclosure relates generally to a power-factor-correction (PFC) power converter, and more particularly to control methods and power controllers in use of PFC power converters capable of achieving excellent power factor while operating in a discontinuous conduction mode (DCM).

Power factor (PF) of an apparatus indicates how efficient the apparatus uses the power supplied from an alternating-current (AC) line power. The perfect ideal value of PF of an apparatus is "1", implying that the voltage from a line power is completely in phase with and proportional to the current that the apparatus drains from the line power. An electric apparatus has PF with a value less than 1 implies a line power need be capable of supplying more that the maximum operation power of the electric apparatus to keep it work properly. To lower the burden of the AC line power that the grid of a city supports, industrial regulations normally define minimum PF for different electric appliances. Power supplies with maximum output power more than 75 W, and lighting apparatuses as well, for example, are required to each have more than minimum PF of 0.9.

For common practices, a PFC circuit is used as a buffer to shape the waveform of the input current from a line power, and according builds up another power source, which could be the input power source of another power supply that accurately regulates an output voltage source for a load. Active PFC circuits refer to the usage of active components, such as power switches or amplifiers, in PFC circuits. A booster or a flyback converter, examples of an active PFC circuit, may achieve high PF by working at a constant ON-time scheme in a critical mode (CM), where constant ON-time scheme refers to the ON time of a power switch is about a constant independent to the line voltage of the line power, and CM refers to that the ON time always starts soon after an inductor or a transformer stops supplying current to the output voltage source. When the load of the booster, for example, is in a light load condition or a no-load condition, CM adversely causes a very short switching cycle of the power switch, and makes switching loss of the power switch high, significantly reducing the conversion efficiency of the booster.

A PFC power converter may refer to a booster alone, or the combination of the booster and a power supply following the booster.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
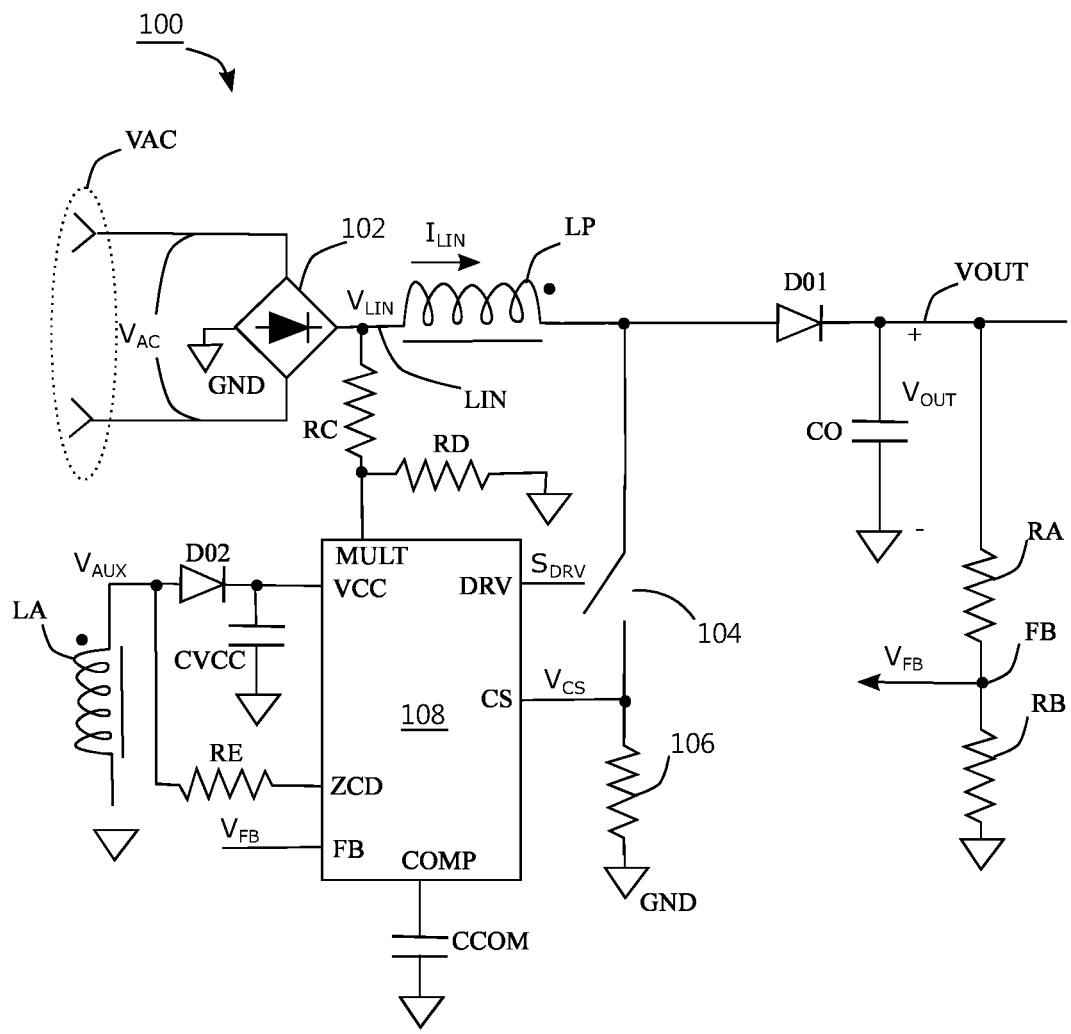
FIG. 1 demonstrates a PFC converter according to embodiments of the invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A booster is disclosed as an embodiment of the invention, but the invention is not limit to however. Embodiments of the invention could include a flyback converter or a buck-booster converter for example.

A PFC power converter according to embodiments of the invention has a power switch and an inductive device connected in series, where the power switch is controlled by a power controller. The PFC power converter converts an input line power into an output power with an output voltage. The power controller has a compensation circuit, an adaptation circuit, and an ON-time controller. By comparing the output voltage and a target voltage, the compensation circuit generates a compensation signal. The adaptation circuit provides an adapted compensation signal in response to an ON time of the power switch, a discharge time of the inductive device, and the compensation signal. Based on the adapted compensation signal, the ON-time controller determines the ON time of the power switch. The adaptation circuit makes the ON time, the compensation signal, the discharge time, and the adapted compensation signal fit a predetermined correlation.

In embodiment the one of invention, the predetermined correlation enables an average input current of the inductive device about proportional to the line voltage of a line power, especially when the PFC power converter operates in a discontinuous conduction mode (DCM), no matter how much an OFF time of the power switch is longer than the discharge time of the inductive device. Accordingly, the PFC power converter is expected to have excellent PF.

FIG. 1 demonstrates PFC converter 100 according to embodiments of the invention. PFC converter 100 is a booster, having bridge rectifier 102, a transformer with primary winding LP and auxiliary winding LA, power switch 104, current-sense resistor 106, power controller 108, resistors RA, RB, RC, RD, RE, output capacitors CO, CVCC, compensation capacitor CCOM, and rectifiers D01, D02, connection of which is shown in FIG. 1. PFC converter 100 converts AC line power VAC with AC voltage $V_{AC}$ into output power VOUT with output voltage $V_{OUT}$.

Bridge rectifier 102 performs full-wave rectification to AC line power VAC, and provides line-voltage signal $V_{LIN}$ at input power line LIN while the voltage at ground line GND is deemed to be 0V.

Connected in series between input power line LIN and ground line GND are primary winding LP, power switch 104 and current-sense resistor 106. By turning ON and OFF power switch 104, power controller 108 controls inductor current $I_{LIN}$ flowing through primary winding LP. Current-sense resistor 106 provides to power controller 108 current-sense signal $V_{CS}$, which can represent inductor current $I_{LIN}$ when power switch 104 is turned ON to act as a short circuit.

Figure 2:
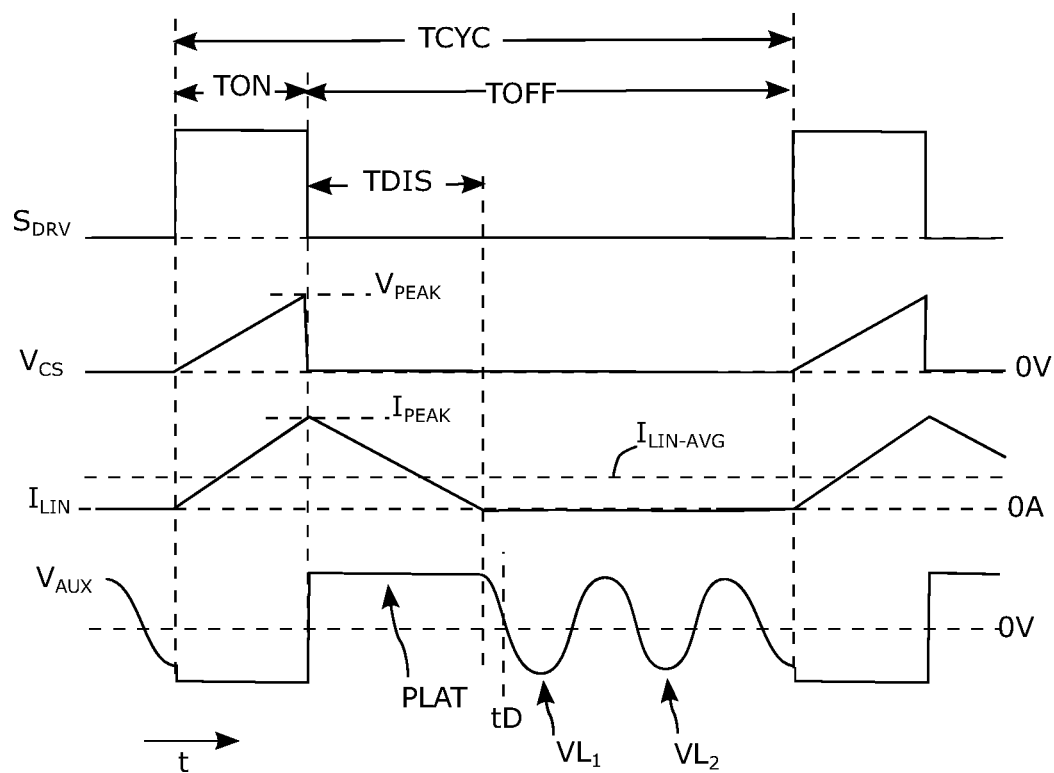
FIG. 2 shows waveforms of signals in FIG. 1.

FIG. 2 shows waveforms of signals including, from top to bottom, driving signal $S_{DRV}$ that power controller 108 generates to control power switch 104, current-sense signal $V_{CS}$, inductor current $I_{LIN}$, and node voltage $V_{AUX}$ at one end of auxiliary winding LA.

Power controller 108 uses driving signal $S_{DRV}$ to turn ON and OFF power switch 104. The time period when power switch 104 is turned ON to act as a short circuit is referred to as an ON time TON. In the opposite, the time period when it is turned OFF to act as an open circuit is referred to as an OFF time TOFF. A switching cycle TCYC consists of an ON time TON and an OFF time TOFF, as shown in FIG. 2.

During an ON time TON, primary winding LP energizes, inductor current $I_{LIN}$ and current-sense signal $V_{CS}$ increasing linearly overtime. During an OFF time TOFF, current-sense signal $V_{CS}$ stays at about 0V because power switch 104 acts as an open circuit. During an OFF time TOFF, inductor current $I_{LIN}$ decreases linearly overtime to release to output power VOUT energy that primary winding LP stores until inductor current $I_{LIN}$ reaches 0A. Discharge time TDIS of primary winding LP refers to the time period from the end of an ON time TON to the moment when inductor current $I_{LIN}$ reaches about 0A. For some embodiments, discharge time TDIS may refer to the time period from the end of an ON time TON to moment tD shown in FIG. 2 when node voltage $V_{AUX}$ drops across 0V the first time after an ON time TON.

During an ON time TON, node voltage $V_{AUX}$ is about a negative constant reflecting the value of line-voltage signal $V_{LIN}$. Nevertheless, node voltage $V_{AUX}$ turns to be about a positive constant as shown by plateau PLAT in FIG. 2, and the positive constant reflects the difference between output voltage $V_{OUT}$ and line-voltage signal $V_{LIN}$. After the end of discharge time TDIS, node voltage $V_{AUX}$ vibrates and generates signal valleys $VL_1$, $VL_2$, for example, until the beginning of a next ON time TON, as shown in FIG. 2.

Figure 3:
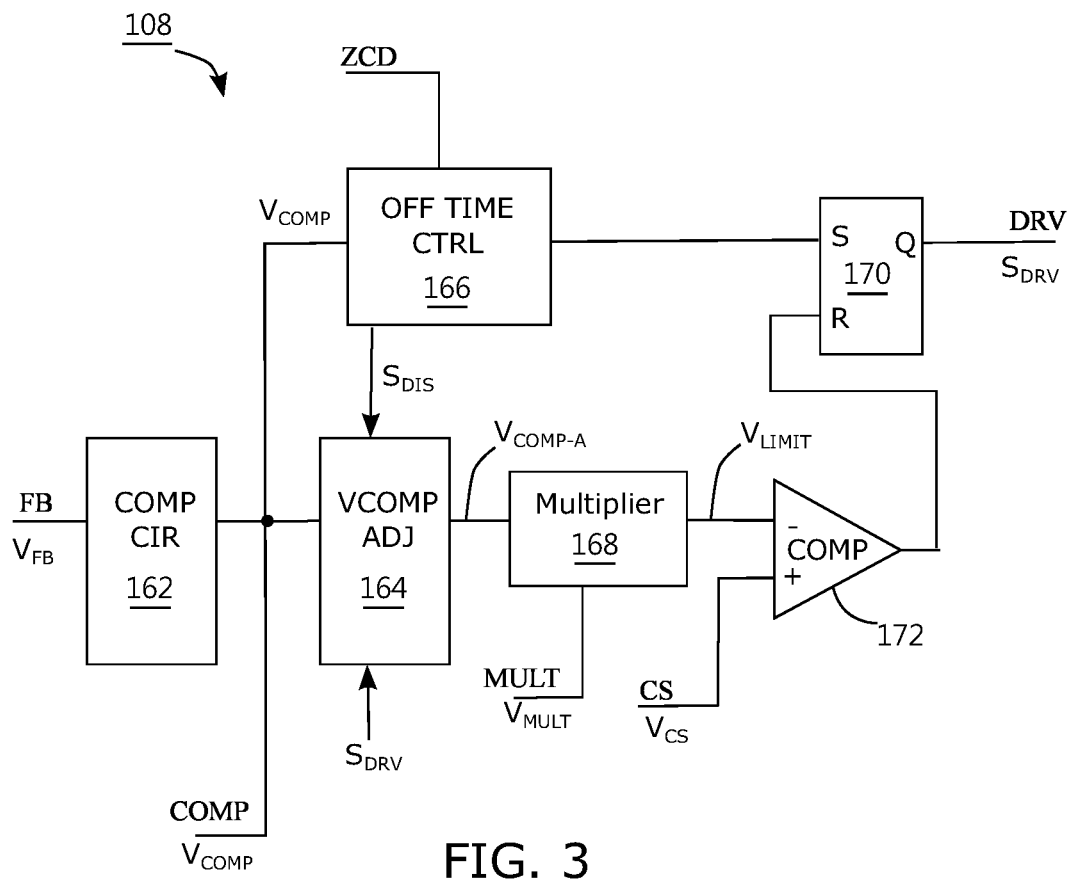
FIG. 3 demonstrates a power controller.

FIG. 3 demonstrates power controller 108 of FIG. 1, including compensation circuit 162, adaptation circuit 164, multiplier 168, OFF-time controller 166, ON-time controller 172, and SR flipflop 170.

Compensation circuit 162 compares output voltage $V_{OUT}$ with a predetermined target voltage, to provide compensation signal $V_{COMP}$. For instance, compensation circuit 162 might have a transconductor comparing feedback voltage $V_{FB}$ at feedback node FB with 2.5 volt, to charge or discharge compensation capacitor CCOM and accordingly adjust compensation signal $V_{COMP}$ at compensation node COMP. In one embodiment of the invention, compensation signal $V_{COMP}$ is higher when the load output power $V_{OUT}$ supplies power to is a heavy load than it is when the load is a light load. As feedback signal $V_{FB}$ is generated by dividing output voltage $V_{OUT}$ by resistors RA and RB, compensation circuit 162 equivalently compares output voltage $V_{OUT}$ with a predetermined target voltage, which corresponds to the value of output voltage $V_{OUT}$ when feedback voltage $V_{FB}$ is 2.5 volt.

Adaptation circuit 164, in response to driving signal $S_{DRV}$, discharge signal $S_{DIS}$, and compensation signal $V_{COMP}$, generates adapted compensation signal $V_{COMP-A}$. Driving signal $S_{DRV}$ provides information of an ON time TON, and discharge signal SDIS the information of discharge time TDIS. Adaptation circuit 164 makes compensation signal $V_{COMP}$, adapted compensation signal $V_{COMP-A}$, an ON time TON, and discharge time TDIS fit a predetermined correlation, as expressed in the following equation (I), $$V_{COMP-A} = KA * V_{COMP} * T_{CYC}/(T_{ON}+T_{DIS}) \quad (I),$$

Where KA is a constant, and $T_{ON}$, $T_{DIS}$, and $T_{CYC}$ are the lengths of an ON time TON, discharge time TDIS, and a switching cycle TCYC. It will be detailed later that equation (I) causes PFC power converter 100 to have excellent PF when operating in DCM.

Multiplier 168 multiplies adapted compensation signal $V_{COMP-A}$ by input signal $V_{MULT}$, to generate current-limiting signal $V_{LIMIT}$, where input signal $V_{MULT}$ is generated by resistors RC and RD dividing line-voltage signal $V_{LIN}$. Equivalently, current-limiting signal $V_{LIMIT}$ is generated by multiplying line-voltage signal $V_{LIN}$ by adapted compensation signal $V_{COMP-A}$. For example, equation (II) below demonstrates a relationship of current-limiting signal $V_{LIMIT}$, adapted compensation signal $V_{COMP-A}$, and line-voltage signal $V_{LIN}$.

$$V_{LIMIT} = KM * V_{MULT} * V_{COMP-A} = KM * V_{LIN} * V_{COMP-A}, \quad (II)$$

Where Km and KM are two constants. Based on equation (I), adapted compensation signal $V_{COMP-A}$ in equation (II) can be replaced, and equation (II) can be rewritten as $$V_{LIMIT} = K_O * V_{LIN} * V_{COMP} * T_{CYC}/(T_{ON}+T_{DIS}) \quad (III),$$

where KO is another constant related to KM and KA.

ON-time controller 172 controls length $T_{ON}$ of an ON time TON. For example, ON-time controller 172 might have a comparator comparing current-limiting signal $V_{LIMIT}$ with current-sense signal $V_{CS}$, and when current-sense signal $V_{CS}$ is found to exceed current-limiting signal $V_{LIMIT}$, ON-time controller 172 signals SR flipflop 170 to make diving signal $S_{DRV}$ "0" in logic, turning OFF power switch 104 and ending an ON time $T_{ON}$. Current-sense signal $V_{CS}$ returns back to 0V when power switch 104 is turned OFF. In other words, ON-time controller 172 makes peak $V_{PEAK}$ Of current-sense signal $V_{CS}$ substantially equal to current-limiting signal $V_{LIMIT}$. Derivable from FIGS. 1 and 2, peak $V_{PEAK}$ is about $I_{PEAK} * R_{106}$, where $I_{PEAK}$ denotes the current peak of inductor current $I_{LIN}$, and $R_{106}$ the resistance of current-sense resistor 106.

OFF-time controller 166 controls length $T_{OFF}$ of an OFF time TFF. In one embodiment of the invention, OFF-time controller 166 detects node voltage $V_{AUX}$ of auxiliary winding LA, via resistor RE and node ZCD, where ZCD stands for zero-current-detection. Please refer to both FIGS. 2 and 3. OFF-time controller 166 might determine the end of a discharge time TDIS if it is found that node voltage $V_{AUX}$ starts falling from plateau PLAT, to generate discharge signal $S_{DIS}$ accordingly. OFF-time controller 166 could determine that a signal valley of node voltage $V_{AUX}$ is about to happen if node voltage $V_{AUX}$ drops across 0 volt, so as to conclude an OFF time TOFF. Node voltage $V_{AUX}$ is at a local minimum when a signal valley occurs. For example, OFF-time controller 166 provides blanking time TBLNK after the end of an ON time TON, based on compensation signal $V_{COMP}$. The heavier load the higher compensation signal $V_{COMP}$ the shorter blanking time TBLNK. When the first signal valley after the end of blanking time TBLNK is about to happen, OFF-time controller 166 signals SR flipflop 170 to make diving signal $S_{DRV}$ "1" in logic, turning ON power switch 104 and ending an OFF time TOFF. Valley switching is therefore achieved to save conduction loss, as power switch 104 is turned ON at about the moment when a signal valley occurs. Since signal valleys only occur after discharge time TDIS ends, OFF-time controller 166 makes PFC converter 100 operate at DCM because of valley switching. Furthermore, if valley switching is performed when the first signal valley after discharge time TDIS ends is about to occur, it is operated at critical mode (CM) or boundary mode (BM), a special condition of DCM. OFF-time controller 166 equally controls the length of a switching cycle TCYC and the switching frequency of power switch 104, based on compensation signal $V_{COMP}$.

Figure 4:
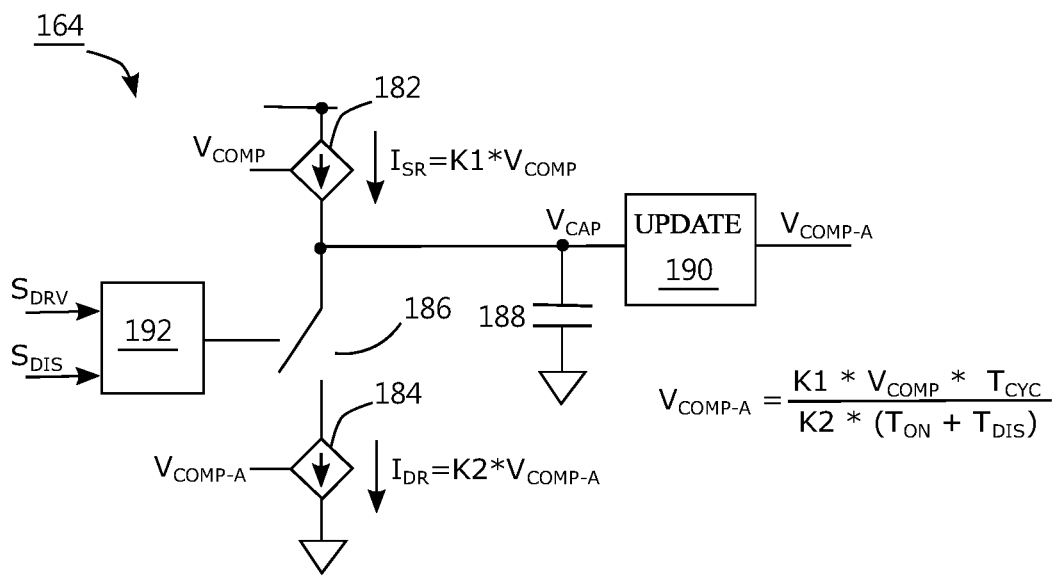
FIG. 4 demonstrates the adaptation circuit in FIG. 3.

FIG. 4 demonstrates adaptation circuit 164, including but not limited to include voltage-controlled current source 182, 184, switch 186, capacitor 188, and update circuit 190, where adaptation circuit 164 can achieve the predetermined correlation among compensation signal $V_{COMP}$, adapted compensation signal $V_{COMP-A}$, ON time $T_{ON}$, and discharge time TDIS in equation (I). Voltage-controller current source 182 provides current $I_{SR}$ in response to compensation signal $V_{COMP}$, making $I_{SR}=K1*V_{COMP}$, where K1 is a constant. Current $I_{SR}$ charges capacitor 188, and increases capacitor voltage $V_{CAP}$. Analogously, voltage-controller current source 184 provides current $I_{DR}$ in response to adapted compensation signal $V_{COMP-A}$, making $I_{DR}=K2*V_{COMP-A}$, where K2 is a constant. Current IDR discharges capacitor 188 and decreases capacitor voltage VCAP when switch 186 is turned ON to perform a short circuit. Switch 186 is under control of logic circuit 192, which turns ON switch 186 only during an ON time $T_{ON}$ and an discharge time TDIS. Update circuit 190 is for example a switched-capacitor circuit, which samples capacitor voltage $V_{CAP}$ to adjust adapted compensation signal $V_{COMP-A}$. When reaching a balanced condition, capacitor voltage $V_{CAP}$ should remain unchanged after one switching cycle TCYC. In other words, the charge pouring into capacitor 188 should be equal to the charge drained from capacitor 188, and the balanced condition implies $$I_{SR}*T_{CYC}=I_{DR}*(T_{ON}+T_{DIS}) \qquad (IV).$$

The following equation (V) can be derived by replacing currents $I_{SR}$ and $I_{DR}$ in equation (IV) with compensation signal $V_{COMP}$ and adapted compensation signal $V_{COMP-A}$.

$$V_{COMP-A}=(K1/K2)*V_{COMP}*T_{CYC}/(T_{ON}+T_{DIS}) \qquad (V).$$

K1/K2 in equation (V) can be designed to be constant KA in equation (I), so adaptation circuit 164 in FIG. 4 achieves equation (I), the predetermined correlation among compensation signal $V_{COMP}$, adapted compensation signal $V_{COMP-A}$, ON time $T_{ON}$, and discharge time TDIS.

PFC power converter 100 can have excellent PF if it operates in DCM, and makes average current $I_{LIN-AVG}$ of inductor current $I_{LIN}$ proportional to line-voltage signal $V_{LIN}$. FIG. 2 shows average current $I_{LIN-AVG}$ representing the average of inductor current $I_{LIN}$ in one switching cycle TCYC, and average current $I_{LIN-AVG}$ can be derived by the following equation (VI), $$I_{LIN-AVG} = 0.5 * I_{PEAK} * (T_{ON} + T_{DIS})/T_{CYC} = \qquad (VI)$$
$$0.5 * V_{PEAK}/R_{106} * (T_{ON} + T_{DIS})/T_{CYC}.$$

As mentioned before, peak $V_{PEAK}$ is about current-limiting signal $V_{LIMIT}$, and current-limiting signal $V_{LIMIT}$ can be replaced based on equation (III). Therefore, the expression of average current $I_{LIN-AVG}$ in equation (VI) can be rewritten as $$I_{LIN-AVG} = 0.5 * KO * V_{LIN} * V_{comp} * \qquad (VII)$$
$$T_{CYC}/(T_{ON} + T_{DIS})/ R_{106} * (T_{ON} + T_{DIS}) / T_{CYC} =$$
$$0.5 * KO * V_{LIN} * V_{comp} / R_{106} = KT * V_{LIN} * V_{COMP},$$

Where KT is another constant correlated with constant KO and resistance $R_{106}$. It is obviously indicated in equation (VII) that average current $I_{LIN-AVG}$ is proportional to line-voltage signal $V_{LIN}$, and the ratio of average current $I_{LIN-AVG}$ to line-voltage signal $V_{LIN}$ is determined by compensation signal $V_{COMP}$. Accordingly, PFC power converter 100 can have excellent PF when operating in DCM.

When the load of PFC power converter 100 is in a light condition or a no-load condition, the introduction of blanking time TBLNK can cause PFC power converter 100 to operate in DCM, and enjoy reduced switching loss because of the reduced switching frequency. Even if discharge time TDIS is much shorter than an OFF time TOFF, it is demonstrated that PFC power converter 100 still can have excellent PF.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a PFC power converter comprising a power switch and an inductive device, comprising:

providing a compensation signal in response to an output voltage of the PFC power converter;

providing an adapted compensation signal in response to an ON time of the power switch and the compensation signal, to make the adapted compensation signal, the ON time, and the adapted compensation signal fit a predetermined correlation; and determining the ON time of the power switch in response to the adapted compensation signal.

2. The control method as claimed in claim 1, further comprising:
providing the adapted compensation signal in response to the ON time, the compensation signal, and a discharge time of the inductive device;
wherein the predetermined correlation correlates the adapted compensation signal, the compensation signal, the ON time, and the discharge time.

3. The control method as claimed in claim 1, wherein the predetermined correlation correlates the adapted compensation signal, the ON time, the adapted compensation signal, and a switching cycle of the power switch.

4. The control method as claimed in claim 1, comprising:
controlling an OFF time of the power switch in response to the compensation signal, to operate the PFC power converter in a discontinuous conduction mode.

5. The control method as claimed in claim 1, comprising:
providing a first current in response to the compensation signal, to change a capacitor voltage toward a first direction;
providing a second current in response to the adapted compensation signal and the ON time, to change the capacitor voltage toward a second direction opposite to the first direction; and
adjusting the adapted compensation signal in response to the capacitor voltage.

6. The control method as claimed in claim 1, comprising:
multiplying the adapted compensation signal by a line-voltage signal to generate a current-limiting signal; and
determining the ON time in response to the current-limiting signal and a current-sense signal;
wherein the current-sense signal represents an inductor current flowing through the inductive device.

7. A power controller in use of a PFC power converter with a power switch and an inductive device, wherein the PFC power converter provides an output power source with an output voltage, the power controller comprising:
a compensation circuit for comparing the output voltage with a target voltage to generate a compensation signal;
an adaptation circuit for providing an adapted compensation signal in response to an ON time of the power switch and the compensation signal, to make the ON time, the compensation signal and the adapted compensation signal fit a predetermined correlation; and
an ON-time controller controlling the ON time of the power switch in response to the adapted compensation signal.

8. The power controller as claimed in claim 7, wherein the predetermined correlation correlates the adapted compensation signal, the compensation signal, the ON time, and a discharge time of the inductive device.

9. The power controller as claimed in claim 7, wherein the adaptation circuit comprises:
a capacitor;
a first voltage-controlled current source providing a first current in response to the compensation signal, to constantly change a capacitor voltage of the capacitor toward a first direction;
a second voltage-controlled current source providing a second current in response to the adapted compensation signal, to change the capacitor voltage toward a second direction opposite to the first direction during the ON time; and
an update circuit adjusting the adapted compensation signal based on the capacitor voltage.

10. The power controller as claimed in claim 7, wherein the ON time controller comprises:
a multiplier multiplying the adapted compensation signal by a line-voltage signal to generate a current-limiting signal; and
a comparator comparing the current-limiting signal with a current-sense signal to determine the ON time;
wherein the current-sense signal represents an inductor current flowing through the inductive device.

11. The power controller as claimed in claim 7, further comprising:
an OFF-time controller controlling an OFF time of the power switch in response to the compensation signal, to operate the PFC power converter in a discontinuous conduction mode.

12. The power controller as claimed in claim 11, wherein the OFF-time controller determines a blanking time according to the compensation signal, and makes the OFF time not less than the blanking time.

* * * * *